United States Patent [19]
Colyer et al.

[11] Patent Number: 5,216,065
[45] Date of Patent: Jun. 1, 1993

[54] EMULSION POLYMERIZATION WITH LARGE PARTICLE SIZE

[75] Inventors: Emerson K. Colyer, Kettering; Elizabeth A. B. Reno, Lancaster; Charles G. Ruffner, Jr.; Rong-Chang Liang, both of Centerville, all of Ohio

[73] Assignee: The Mead Corporation, Dayton, Ohio

[21] Appl. No.: 619,798

[22] Filed: Nov. 29, 1990

[51] Int. Cl.$^5$ .......................... C08F 2/22; C08F 2/24; C08F 2/38

[52] U.S. Cl. .................................. 524/459; 524/457; 526/78; 526/79; 526/80; 526/81; 526/82; 526/83; 526/84; 526/85; 526/86; 526/87

[58] Field of Search ................... 524/459, 457; 526/78, 526/79, 80, 81, 82, 83, 84, 85, 86, 87

[56] References Cited

U.S. PATENT DOCUMENTS

| | | | |
|---|---|---|---|
| 3,541,037 | 11/1970 | Finn et al. | 526/87 |
| 3,953,386 | 4/1976 | Murphy et al. | 526/319 |
| 4,254,004 | 3/1981 | Abbey | 526/80 |
| 4,539,361 | 9/1985 | Siol et al. | 524/460 |
| 4,908,240 | 3/1990 | Auhorn et al. | 524/819 |
| 4,914,142 | 4/1990 | Takarabe et al. | 524/314 |
| 4,916,191 | 4/1990 | Takeuchi et al. | 525/242 |
| 5,064,717 | 11/1991 | Suzuki et al. | 428/352 |

Primary Examiner—Paul R. Michl
Assistant Examiner—Patrick Niland
Attorney, Agent, or Firm—Thompson, Hine and Flory

[57] ABSTRACT

A process for emulsion polymerization to form a latex having a particle size greater than about 0.5 micrometers by charging to a reaction vessel under agitation a reaction mixture including water, emulsifiers at an initial concentration slightly greater than or equal to the critical micelle concentration, a protective colloid, ethylenically unsaturated monomers, and an ionically balanced combination of an anionic and a cationic water soluble free radical initiator or a nonionic initiator; reacting the mixture to form an emulsion of polymerized monomer; and adding additional monomer, emulsifier, and protective colloid and a water soluble chain transfer agent to the reactor while continuing to agitate the mixture under conditions such that the emulsifier concentration does not exceed that at which new polymeric nuclei are formed.

10 Claims, 3 Drawing Sheets

EMULSION POLYMERIZATION WITH LARGE PARTICLE SIZE

BACKGROUND

The present invention relates to a method for emulsion polymerization which is characterized in that it yields a latex having a larger particle size than can typically be obtained by an emulsion polymerization process.

Methods for emulsion polymerization are well known in the art, however, these methods are generally not considered practical for producing particles larger than about one micron. The particle size is typically in the range of 0.05 to 0.3 microns.

Methods for producing larger size particles have been reported but these methods are often time consuming, require a large number of steps, and do not yield a high concentration of solids. As such they are not desirable for use in a commercial setting. For example from commonly assigned U.S. Pat. No. 4,877,761 it is known to prepare a seed emulsion and to grow larger particles by subsequently adding more monomer and surfactant to the emulsion. In one such method, three or four cycles of monomer addition may be required to grow a particle larger than one micron size. Each cycle may require several hours to perform and the product may contain less than 30% solids.

Other methods have also been tried. An emulsifier free method is disclosed by Matsumoto et al. *Kobunshi Kagakir*, 22, 481 (1965) and Chung-Li et al., *Progress Colloid Polym. Sci.*, 60, 163 (1976), but this method generally yields an emulsion of low solids, small particle size, and poor stability.

Some methods have been studied for making toner particles such as microsuspension polymerization (see U.S. Pat. No. 2,932,629), but this process generally yields a broad particle size distribution in the range of 1 to 100 microns. Due to limitations on heat transfer and the large exothermic heat of polymerization, it is difficult to prepare latices having a high solids content.

One technique which has been proposed to prepare large-size latices in fewer steps is a modified version of seeded emulsion polymerization. In this process, an emulsion of seed particles is formed and the seed particles are swollen by the addition monomer. The monomer penetrates the seed particle and is polymerized there. The process is generally performed on a batchwise basis and is not practical in producing particles having a core-shell morphology. There are also limits on the amount of monomer which can be taken up by the seed particles and on how large a particle can be formed. Ugelstad, et al., *Adv. Coll. Int. Sci.*, 13, 101 (1980) disclose one process in which a water immiscible solvent is added to the monomer and a water miscible solvent is added to the aqueous phase to enhance the transport of monomer into the particle.

U.S. Pat. No. 4,247,434 to Vanderhoff et al. discloses another seeded emulsion polymerization process in which an inhibitor is used in the aqueous phase and an oil soluble initiator is employed to avoid new particle generation. A water soluble polymeric emulsifier and a nonpolymeric emulsifier are used to stabilize the emulsion. In this process, solid content remains low and the cycle time to produce particles larger than one micron remains large.

Another technique is dispersion polymerization. Uniform micro-sized particles in up to 40% solids content have been reported with the process using a variety of solvents as the dispersion medium with solvent soluble initiators and polymeric stabilizers.

SUMMARY OF THE INVENTION

In accordance with the present invention large polymeric particles are obtained by emulsion polymerization in high concentrations through the use of a combination of practices which is designed to control and minimize the formation of new particle micelles and hence force the growth of larger particles. In most conventional emulsion polymerization processes, the emulsifier concentration in the aqueous phase exceeds the critical micelle concentration throughout the process. In these processes, micelles can freely form because there is excess surfactant available to form new micelles. As a result, as the monomers polymerize in the aqueous phase or in the micelles, new polymer forms, but instead of adding to the growth of pre-existing particles, new particles are formed and a latex of smaller particles having a wide size distribution is obtained.

The process of the present invention is advantageous because it yields larger particles in high concentrations in shorter reaction times. For illustration, in accordance with the present invention, particles larger than 0.5 micron and typically on the order of 1.0 to 2.5 microns are obtained at over 30% solids with a narrow size distribution in a single semi-continuous process requiring less than one-half day in many cases.

A chief objective of the present invention is to control the amount of the emulsifier to limit nucleation and thereby force polymerization to contribute to particle growth instead of the formation of new particles.

In typical emulsion polymerization processes, there are two sources of emulsifier. One source is the emulsifier which is actively added to the system to form and maintain the emulsion, but the other source is the charged polymeric species which originate from charged monomers and/or charged fragments of the water soluble initiator. It has been found that both sources must be controlled in the emulsion polymerization process in order to form narrowly distributed larger particles. By narrowly distributed is meant that more than 68% of the particles will fall within ±30% of the mean. One example of the latter is shown in Eq. 1 below for the reaction of monomer with ammonium persulfate:

$$S_2O_8^= \rightarrow SO_4^-\cdot + M \rightarrow \cdot(M)_nSO_4^- \qquad \text{(Eq. 1)}$$

The species $\cdot(M)_nSO_4^-$ is a surfactant.

In the process of the invention the surfactant concentration (from both sources) is slightly higher than or equal to the critical micelle concentration at the start of the process (and then only slightly) when the polymeric particles are formed which will be the nucleus for continued particle growth as polymerization proceeds. However, after the start of the process, the surfactant concentration from both sources is controlled to prevent or minimize the formation of new particles.

Through the use of the techniques disclosed herein a practical semi-continuous emulsion polymerization process is provided which does not involve the step-wise and time-demanding approaches which characterized previous processes having as their object providing emulsions or latexes of large particle size.

To prevent the ionic species generated by aqueous phase polymerization from contributing to nucleation, a sophisticated technique is used to balance the surface charge on the particle through the combined use of positively and negatively charged initiators. If a positively or negatively charged initiator is used alone, charged polymeric species can form. These polymeric species are surface active and can form new nuclei for polymerization, or replace surfactants on the surface of particles. This results in an excess of surfactants in the aqueous phase and in turn new nuclei for particle formation. In accordance with the invention, positively and negatively charged species are balanced. The surfactant properties are neutralized and nucleation can be prevented.

The emulsion is stabilized through the use of a water soluble polymer which is initially present and is metered into the reaction mixture in additional amounts as the reaction proceeds. In known processes, the water soluble polymer has been observed to react with the radicals in the aqueous phase or at the surface of the polymer particles and become grafted onto particles through covalent bond formation. This causes the viscosity of the emulsion to increase to an undesirable level, and very often results in an unstable emulsion via a particle bridging mechanism by the grafted water soluble polymers. In accordance with another aspect of the invention, the stability of the latex is further enhanced through the use of low molecular weight water soluble compounds which appear to function as chain transfer agents and reduce the probability of grafting and undesirable bridging of the particles by the water soluble polymer. The present invention resides in an emulsion polymerization process which comprises Initially charging to a reactor, under agitation, a reaction mixture including:

water, emulsifier at an initial concentration slightly greater than or equal to the critical micelle concentration, a water soluble polymer which functions as a protective colloid, ethylenically unsaturated monomers, an ionically balanced combination of an anionic and a cationic free radical initiator or a non-ionic initiator, and optionally a water soluble chain transfer agent;

bringing said reaction mixture to a condition at which said monomer polymerizes and an emulsion of said polymerized monomer is formed;

adding additional monomer, emulsifier, protective colloid and a water soluble chain transfer agent to said reactor while continuing to agitate said reaction mixture in amounts and under conditions which are controlled such that the concentration of said emulsifier does not exceed a concentration at which substantial new polymeric nuclei are formed, sufficient protective colloid and chain transfer agents are present to stabilize said emulsion, and a latex having an average particle size greater than 1.0 micron and at least 30% solids is formed.

A broader manifestation of the invention is a process for emulsion polymerization in which an ionically balanced combination of an anionic and a cationic initiator or a non-ionic initiator is used to limit nucleation and foster the formation of larger particle size.

Another manifestation of the invention is a process for emulsion polymerization in which a water soluble chain transfer agent is present to prevent viscosity building and emulsion instability due to grafting of the protective colloid onto the polymer particles. Latexes prepared in accordance with the invention generally have viscosities less than 100 cps.

DETAILED DESCRIPTION OF THE INVENTION

Figure 1:
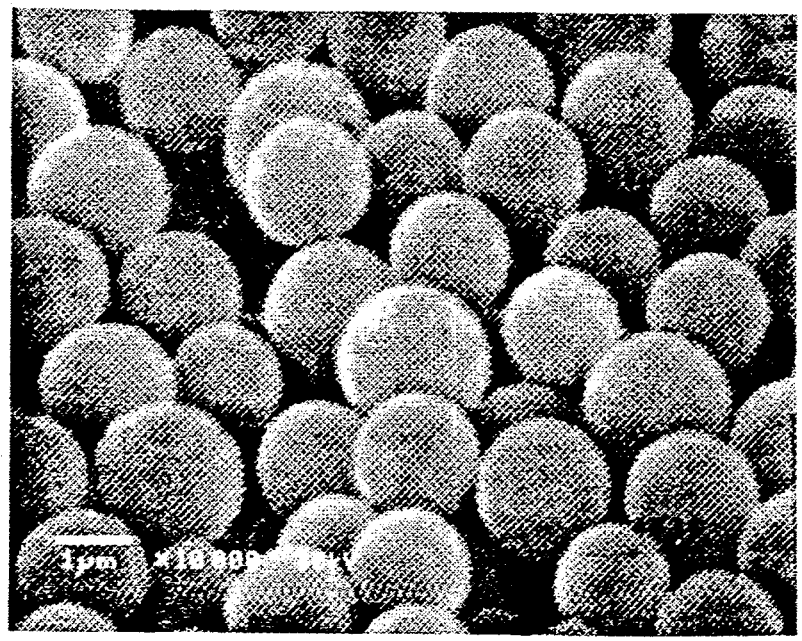
FIGS. 1, 3 and 4 are electron microscope photolithographs of polymeric particles produced in accordance with the present invention.

The process of this invention can be used to polymerize those monomers and monomer mixtures which have previously been polymerized through emulsion polymerization including monofunctional and polyfunctional ethylenically unsaturated monomers such as acrylic acid, acrylates (e.g., methyl, ethyl, butyl, isoamyl acrylates, etc.), methacrylates (e.g., methyl methacrylate, etc.), vinyl benzenes, divinyl benzenes (e.g., styrene, divinyl benzene), acrylonitrile, maleic acid, dimethyl maleate, diethyl maleate, maleic anhydride, dimethyl fumarate, and mixtures thereof, vinyl chloride, vinylidene chloride, vinyl fluoride, vinylidene fluoride, vinyl acetate, butadiene, zinc methacrylate, zinc acrylate, magnesium acrylate and magnesium methacrylate. Substantially any monomer which is copolymerizable with the aforesaid monomers is probably also useful in this process.

In most embodiments of the invention a mixture of monomers will be used which provides a polymeric particle having the properties required or desired in a particular end use. For example, the monomer composition shown in Example 1 is useful in certain developer compositions as described below.

In accordance with a particular embodiment of the invention, monomers are selected to provide a latex which is useful as a developer material or as a resin modifier for a developer material in pressure-sensitive recording papers and cylithographic materials. These particles are characterized by a core-shell construction in which the core has a lower MFFT (minimum film forming temperature) and MFT (melt flow temperature) than the shell such that upon drying, the higher MFFT of the shell prevents the developer particles from coalescing, and upon glossing the lower MFT of the core enables the core to melt readily, plasticize the shell and reduce the temperature and amount of heat required to coalesce the developer. Monomer selections useful in this embodiment of the invention are described in detail in U.S. Pat. Nos. 4,853,364 4,877,761, and 4,970,193. A process useful in preparing a particle having such a core-shell construction is illustrated in Example 1.

At the start of the process, the amount of monomer is adjusted to balance particle size and stability. Higher monomer concentrations yield larger particle size but less stability. Initially, about 6 to 10% of the total monomer to be used in the process is present in the reactor. The amount based on water is about 5 to 15%. Thereafter, monomer is gradually added to the reactor. In the course of the reaction, the monomer composition can be adjusted to produce changes in the particle composition or to introduce more or less crosslinking as may be desirable for a particular end use. In adding the monomer it is generally desired to add monomer at a rate which is approximately the same as the rate with which the monomer is consumed. It is generally undesirable to have excess monomer present in the system as this makes the reaction more difficult to control and the excess monomer may swell and change the properties of the core and inner shells. By limiting the rate of monomer addition, and controlling the hydrophilicity and degree of crosslinking of the monomers added, the newly added monomer forms successive shells of the particle and the particle morphology is more easily controlled. The hydrophilicity of the monomer is controlled so that the monomer adds to the shell of the particle rather than swells the particle.

The emulsifiers useful in the process include those emulsifiers conventionally used in emulsion polymerization processes such as sodium lauryl sulfate, sodium dodecyl benzene sulfonate, esters of sodium sulfosuccinate acids, Abex anionic surfactants (Alcolac Inc.), alkylphenoxy polyethoxy ethanol (HLB=13 to 19), ethoxylated fatty alcohols (HLB=13 to 19) and block copolymers of ethylene oxide and propylene oxide.

As indicated above, initially, i.e., at time equals zero (t=0), the emulsifier concentration in the aqueous phase is slightly greater than its critical micelle concentration (CMC). As additional monomer is added to the system, if excess emulsifier is present in the aqueous phase, the excess emulsifier will cause nucleation to occur and result in a broad particle size distribution. Accordingly, the amount of the emulsifier is limited so as to achieve a particle size larger than 0.5 micron and preferably about 1.0 to 2.5 micron.

After t=0, the emulsifier concentration is restricted to an amount less than that which generates substantial new particles. In some cases it can be said that the emulsifier concentration in the aqueous phase is less than the critical micelle concentration. It is important that the emulsifier concentration be lower than that concentration which leads to substantial generation of new particles or nuclei or only small particles will form and large particle size will not be achieved.

Water soluble protective colloids which are normally used in the emulsion polymerization of acrylates may be used herein. Representative examples include hydroxyethyl cellulose, poly (ethylene oxide-propylene oxide) polyvinyl alcohol, polyethyleneoxazoline, and polyvinyl pyrrolidone (PVP), and their copolymers. The protective colloid is usually employed in an amount of about 0.1 to 1.5% based on the monomer.

Water soluble catalysts or initiators for the emulsion polymerization of acrylates can be selected from those previously used in emulsion polymerization. Representative examples of cationic initiators include 2,2'-azobis(2-amidinopropane) dihydrochloride (V-50 from Wako), 2,2'-azobis (N,N'-dimethyleneisobutyramidine) dihydrochloride (VA-044). Representative examples of anionic initiators include ammonium persulfate, disodium 2,2'-azobis-2-cyanopropane-1-sulphonate.

Use of a neutral initiator instead of a charged initiator may be possible however, this is extremely difficult. However, it may be desirable to use a non-ionic initiator in combination with the ionic initiators to increase monomer conversion as the non-ionic initiator can more easily infiltrate the particle and react with the unpolymerized material therein.

The catalysts are generally each used in a concentration of about 0.1 to 1% based on the amount of monomer. The amount of each catalyst is adjusted to provide a well-balanced surface charge density on the particles taking into consideration the relative decomposition rates of the initiators. Herein this balanced condition is referred to as "ionically balanced." An initiator having a slower decomposition rate (i.e., radical generation rate) such as ammonium persulphate will be used in a higher amount when used in combination with a initiator which decomposes faster such as V-50, in order to obtain a balance of cationic and anionic species on the particles.

The initiator concentration must be carefully controlled at the start and throughout the process. Excess of either cationic or anionic initiator may destabilize (collapse) the emulsion, or result in a broad particle size distribution. Generally, when an anionic emulsifier is used, the system will be more tolerant of the anionic initiator and vice versa when a cationic emulsifier is used. If too much cationic initiator is used with an anionic emulsifier, the cations may neutralize the emulsifier whereupon the emulsion will collapse. There is also criticality in the lower amounts of initiator used because if too little cationic initiator is present, smaller particles may form as a result of in situ emulsifier formation (as in Eq. 1). These smaller particles will take up more surfactants as they grow and may cause the system to collapse if too many small particles are generated by this mechanism. In the course of the process the amount of the initiator may be adjusted in order to maintain the charge balance.

Optionally, a non-ionic initiator may be used along with the combination of cationic and anionic initiators. Water soluble non-ionic initiator such as $H_2O_2$, Wako VA-080, VA-082, AIBN, and oil soluble non-ionic initiator such as benzoyl peroxide, lauroyl peroxide, may be used to enhance the conversion or rate of polymerization.

The function of chain transfer agents in the process is not entirely clear, although it appears that the chain transfer agent prevents particle grafting or bridging through the protective colloid. It has been determined, however, that a water soluble chain transfer agent is essential and that a further improvement in stability can be achieved if an oil soluble chain transfer agent is additionally present. Representative examples of water soluble chain transfer agents include low molecular weight (e.g., less than 3000) alcohols and glycols such as 2-propanol, 1,4-butane-diol, ethylene glycol, propylene glycol, methanol, glucose, sucrose, lactose, tartaric acid and mercaptans such as thioglycolic acid, glycerol bis-mercaptoacetate, mercaptoethyl acetate.

The water soluble chain transfer agent is used in an amount of about 0.1 to 2% based on water and preferably 0.5 to 1.5%. In the course of the process, the amount may be adjusted in order to maintain the effective ratio of chain transfer agent to the protective colloid added.

Examples of oil soluble chain transfer agents include normal or tertiary dodecyl mercaptan. This agent is generally used in an amount of about 0.05 to 0.6% based on monomers used.

In the course of the reaction, pH is controlled at 3.0 to 6.5, preferably at 4.5 to 6.0). It is know that the decomposition rate of persulphate is strongly dependant on pH of the reaction medium. It decreases sharply with increasing pH and levels off at a pH of about 4. To keep the charge balance, it is essential that decomposition rate of both cationic and anionic initiator be well controlled. As a consequence, a pH greater than 4 was chosen to ensure a constant decomposition rate of persulphate. In contrast, at pH greater than 5.0, a significant amount of methacrylic acid in the recipe will be neutralized, and result in undesirable increases in viscosity and negative charge on the particle surface. In fact, it has been found that a PH of 4.5 to 6.0 is the optimal working range for these reasons.

At the end of the reaction, a reducing agent such as $NaHSO_3$ or $NA_2S_2O_5$ is added to deplete the unreacted persulphate. Since any residual initiator will be a potential yellowing agent for the final coating, it is a common practice to deplete them at the end of reaction.

The process of the present invention can be used in any application where a large particle size latex is desired. In addition to being useful in providing developer materials, this process is also useful in providing pressure-sensitive adhesives and more particularly tacky microspheres of the type described in U.S. Pat. No. 3,691,140 to Silver and U.S. Pat. No. 4,166,152 to Baker and in providing plastic pigments. It may also be useful in making toner particles for use in xerography, however this may necessitate removal of the ionic species from the particle.

The invention will be more specifically illustrated by the following non-limiting examples.

EXAMPLE 1

This example illustrates preparation of a particle having a core-shell construction useful as an additive to a phenolic resin as a developer material as described in more detail in U.S. Pat. Nos. 4,853,364 and 4,970,193.

| | Initial Charge (g) | I (g) | II (g) | III (g) |
|---|---|---|---|---|
| Water Phase Components | | | | |
| $NaHCO_3$ (6% solution) | 2.25 | 6.74 | 6.74 | 4.49 |
| Abex 18-S (10%) 1) | 0.79 | 3.19 | 2.88 | — |
| Igepal Co-897 (10%) 2) | 0.65 | 2.03 | 1.83 | — |
| Vinol 205 (10%) 3) | 2.79 | 5.56 | 4.55 | 0.62 |
| Sodium Acetate (20%) | 1.40 | — | — | — |
| V-50 (10%) 4) | 3.37 | 7.86 | — | — |
| 2-propanol | — | 2.03 | 2.55 | 1.12 |
| Deionized Water | 271.36 | 74.51 | 106.46 | 37.46 |
| Monomer Mixture | | | | |
| Styrene | 18.37 | 116.27 | 116.27 | — |
| 2-Ethylhexylacrylate | 7.47 | — | — | — |
| Methacrylic Acid | 0.17 | 1.26 | 1.69 | 0.69 |
| n-Butylacrylate | — | 25.95 | 25.95 | 1.16 |
| Methyl methacrylate | — | 26.29 | 26.29 | 21.66 |
| Divinyl benzene | — | 0.17 | 0.17 | — |
| n-Dodecanethiol | 0.16 | 0.67 | 1.01 | — |
| Benzoyl peroxide | — | 0.09 | 0.09 | — |

1) Alcolac
2) GAF, ethoxylated nonly phenol
3) Air Products, polyvinyl alcohol
4) Wako Fine Chemicals The initial water phase and monomer mixtures were charged into a reaction vessel under moderate agitation and a nitrogen purge. The temperature was quickly raised to 71°-73° C. while maintaining good agitation. When the reaction mixture reached 65° C., 9.0 g of a 10% solution of ammonium persulfate (APS) was added. This is time t=0. After seven minutes, 7.30 g of a 10% solution of 2,2'-azobis(2-amidinopropane) dihydrochloride available from Wako under the tradename V-50 was added to the reaction vessel. After 90 minutes, the addition of Water Phase I and Monomer Mixture I was begun by adding both solutions concurrently at a constant rate over 210 minutes. After 160 minutes (all times are with respect to t=0), 1.68 g of 10% APS was added. After 230 minutes, an additional 1.68 g of 10% APS was added and the pH was adjusted to 5.5 through the addition of 6.74 g of a 6% solution of sodium bicarbonate. After 300 minutes elapsed, 1.68 g 10% APS solution was added and the addition of Water Phase I and Monomer Mixture I was completed and the addition of Water Phase II and Monomer Mixture II was begun. These solutions were fed to the reaction vessel at a constant rate concurrently over 230 minutes.

After 370 minutes from start, an additional 1.68 g of 10% APS solution was added followed by the addition of another 1.68 g of the solution at 440 minutes from start. After 530 minutes, the addition of Water Phase II and Monomer Mixture II was completed and the addition of Water Phase III and Monomer Mixture III were begun at a constant rate over 30 minutes. Alternatively, a solution of APS can be metered in at a pre-programmed rate over the 440 minutes.

After 560 minutes, immediately following the addition of Water Phase III and Monomer Mixture III, a solution containing 4.49 g of a 6% solution of sodium bicarbonate, 10.5 g of a 10% solution of Vinol-205, 0.56 g isopropanol and 6.86 g water was added. After 620 minutes, the reaction mixture was allowed to cool while maintaining good agitation. When the temperature of the reaction mixture fell below 70° C., 1.12 g of a solution of 10% sodium metabisulfite was added to complete the reaction.

The microspheres are shown in FIG. 1 these microspheres were blended with a phenolic resin, (HRJ 4542) commercially available from Schenectady Chemicals Co. They provided a coating that achieved a color image density of 2.04 to 2.14, which is satisfactory.

The particle size distribution is shown in the following tables.

TABLE 1

| Diameter (microns) | Differential Vol. % over | Cumulative Vol. % under |
|---|---|---|
| 3.0 | 0 | 100 |
| 2.5 | 1.8 | 98.2 |
| 2.0 | 10.1 | 88.1 |
| 1.5 | 42.1 | 46.0 |
| 1.0 | 40.5 | 5.5 |
| 0.9 | 4.5 | 1.8 |
| 0.8 | 1.8 | 0 |
| 0.7 | 0 | 0 |

TABLE 2

| Diameter (microns) | Cumulative Vol. % Under |
|---|---|
| 2.33 | 95 |
| 2.09 | 90 |
| 1.87 | 85 |
| 1.77 | 80 |
| 1.73 | 75 |
| 1.69 | 70 |
| 1.65 | 65 |
| 1.61 | 60 |
| 1.57 | 55 |
| 1.53 | 50 |
| 1.46 | 40 |
| 1.39 | 30 |
| 1.32 | 20 |
| 1.25 | 15 |

EXAMPLE 2

This example illustrates the use of D-glucose as the water phase chain transfer agent and t-dodecanethiol as the oil-soluble chain transfer agent. Instead of sodium bicarbonate, dipotassium phosphate was employed as the buffer to keep the pH of the reaction medium at 5.0–5.5.

|  | Initial Charge (g) | I (g) | II (g) | III (g) |
|---|---|---|---|---|
| Water Phase Components | | | | |
| K$_2$HPO$_4$ (20% solution) | 0.67 | 10.0 | 11.5 | — |
| Abex 18-S (10%) | 0.81 | 3.38 | 2.39 | — |
| Igepal Co-897 (10%) | 0.67 | 2.09 | 1.53 | — |
| Vinol 205 (10%) | 2.88 | 5.72 | 5.92 | 0.33 |
| Sodium Acetate (70%) | 1.44 | — | — | — |
| V-50 (10%) | — | 8.09 | — | — |
| D-Glucose | — | 2.0 | 3.46 | 0.1 |
| Deionized Water | 361.35 | 45.53 | 86.05 | 16.8 |
| Monomer Mixture | | | | |
| Styrene | 18.38 | 116.27 | 111.93 | 5.57 |
| 2-Ethylhexylacrylate | 8.22 | — | — | — |
| Methacrylic Acid | 0.13 | — | — | — |
| n-Butylacrylate | — | 17.35 | — | 0.60 |
| n-Butyl Methacrylate | — | 17.35 | 23.00 | — |
| Methyl methacrylate | — | 22.56 | 38.62 | 5.58 |
| Divinyl benzene | — | 0.17 | 0.17 | — |
| t-Dodecanethiol | 0.08 | 0.52 | 0.53 | — |
| Benzoyl peroxide | — | 0.09 | 0.09 | — |

The initial water phase and monomer mixtures were charged to a reaction vessel under moderate agitation and a nitrogen purge. The temperature was quickly raised to 71°–73° C. while maintaining good agitation. When the reaction mixture reached 65° C., 9.27 g of a 10% solution of ammonium persulfate (APS) was added. This is time t=0. After seven minutes, 3.76 g of a 10% solution V-50 was added to the reaction vessel and after 30 minutes another 3.76 g of the solution was added. After 90 minutes, the addition of Water Phase I and Monomer Mixture I was begun by adding both solutions concurrently at a constant rate over 210 minutes. After 160 minutes (all times are with respect to t=0) 0.97 g of 10% APS was added. After 230 minutes, an additional 0.97 g of 10% APS was added. After 300 minutes elapsed, 0.97 g 10% APS solution was added and the addition of Water Phase I and Monomer Mixture I was completed and the addition of Water Phase II and Monomer Mixture II was begun. These solutions were fed to the reaction vessel at a constant rate concurrently over 230 minutes.

After 370 minutes from start, an additional 0.97 g of 10% APS solution was added followed by the addition of another 0.97 g of the solution at 440 minutes from start. After 530 minutes, the addition of Water Phase II and Monomer Mixture II was completed and the addition of Water Phase III and Monomer Mixture III were begun at a constant rate over 40 minutes.

After 570 minutes, immediately following the addition of Water Phase III and Monomer Mixture III, 10.5 g of a 10% solution of Vinol-205, 2.8 g of D-glucose and 11.7 g water were added. After 630 minutes, the reaction mixture as allowed to cool while maintaining good agitation. When the temperature of the reaction mixture fell below 70° C. 1.12 g of a solution of 10% sodium metabisulfite was added to complete the reaction.

The final batch pH was 5.25. Grit content was less than 0.1% on a 100 mesh screen.

the particle size distribution is shown in the following tables.

TABLE 3

| Diameter (microns) | Differential Vol. % over | Cumulative Vol. % under |
|---|---|---|
| 7.5 | 0 | 100.0 |
| 5.3 | 3.0 | 100.0 |
| 3.7 | 19.0 | 97.0 |
| 2.6 | 34.7 | 78.0 |
| 1.8 | 24.7 | 43.3 |
| 1.3 | 15.6 | 18.6 |
| 0.8 | 3.0 | 3.0 |
| 0.6 | 0 | 0 |

TABLE 4

| Diameter (microns) | Cumulative Vol. % under |
|---|---|
| 3.57 | 95 |
| 3.25 | 90 |
| 2.70 | 80 |
| 2.39 | 70 |
| 2.15 | 60 |
| 1.93 | 50 |
| 1.72 | 40 |
| 1.51 | 30 |
| 1.32 | 20 |
| 1.19 | 15 |

Figure 2:
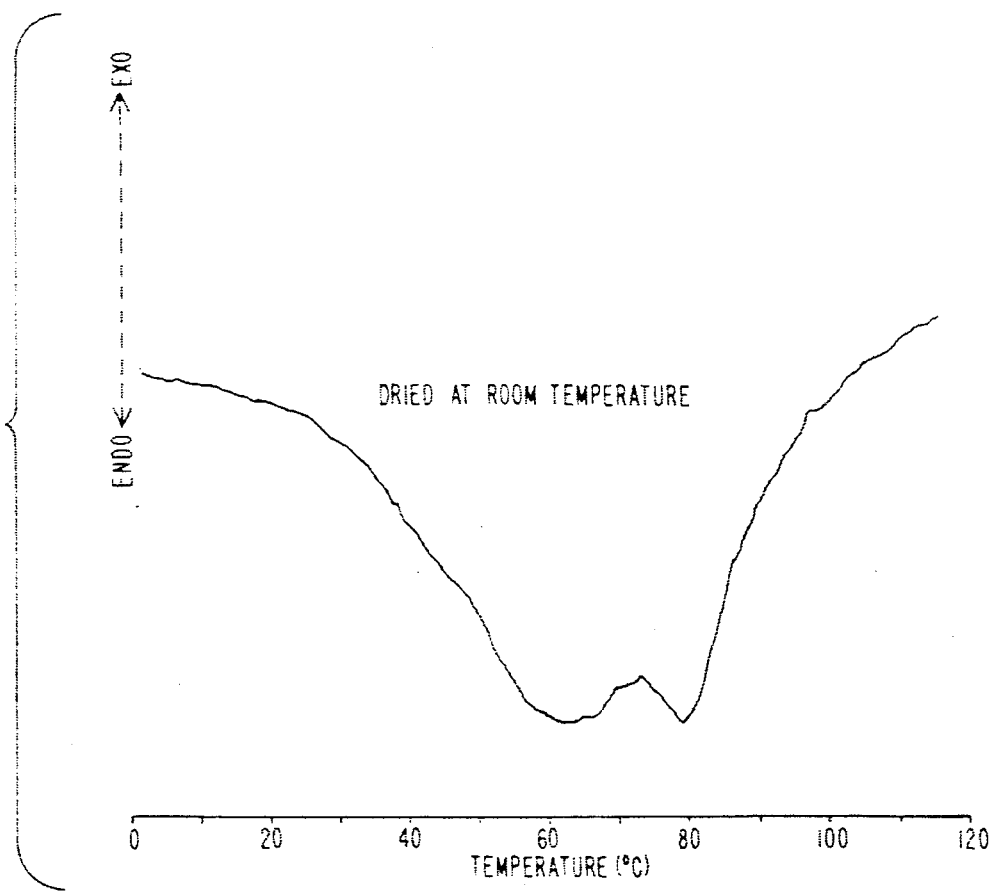
FIG. 2 is a DSC thermogram for the particles of Example 2.

The core-shell morphology of this latex is indicated clearly by the DSC thermograms which show the glass transitions of the shells and the core. (FIG. 2).

EXAMPLE 3 AND COMPANION EXAMPLE 4

These examples illustrate the effect of the ratio of cationic producing to anionic producing initiators on particle size distribution and on control of particle morphology for emulsions utilizing a given stabilization system.

|  | Ex. 3 | C. Ex. 4 | | |
|---|---|---|---|---|
| Ratio of V-50:APS | 0.7667 | 0.3250 | | |
| Monomer Mixtures | Initial Charge | M-I | | |
| Styrene (Sty) | 29.40 | 191.50 | | |
| Methyl methacrylate (MMA) | — | 30.42 | | |
| Butyl acrylate (BA) | — | 55.62 | | |
| 2-Ethylhexyl acrylate (2-EHA) | 13.16 | — | | |
| Methacrylic acid (MAA) | 0.22 | 2.07 | | |
| 1-Dodecanethiol (nDS) | 0.26 | 1.11 | | |
| Divinylbenzene (DVB) | — | 0.28 | | |
| Benzoyl peroxide (BPO) | — | 0.06 | | |
| Water phase Component | Initial Charge | S-I | | S-II |
|  |  | Ex. 3 | Ex. 4 |  |
| Abex 18-S (10% aq.) | 1.30 | 5.25 | 5.25 | — |
| Igepal CO-897 (10% aq.) | 1.07 | 3.35 | 3.35 | — |
| Vinol 205 (10% aq.) | 4.59 | — | — | 5.31 |
| Sodium bicarbonate | — | 0.44 | 0.44 | 0.67 |

-continued

| | | | | |
|---|---|---|---|---|
| Sodium acetate | 0.46 | — | — | — |
| V-50 | — | 0.65 | — | — |
| Ammonium persulfate (APS) | — | — | 1.30 | — |
| Deionized water | 455.34 | 144.21 | 150.06 | 10.68 |

| Component | W1 | W2 | W3 | W4 | W5 Ex.3 | W5 Ex.4 | W6 Ex.3 | W6 Ex.4 | W7 Ex.3 | W7 Ex.4 |
|---|---|---|---|---|---|---|---|---|---|---|
| APS | 1.11 | — | 0.37 | — | 0.28 | 0.56 | 0.51 | 0.18 | 0.51 | 0.1 |
| V-50 | — | 0.65 | — | 0.56 | 0.28 | — | — | — | — | — |
| H2O | 9.99 | 5.83 | 3.33 | 5.00 | 5.00 | 5.00 | 4.68 | 1.66 | 4.58 | 1.6 |
| time line (minutes) | 0 | 7 | 15 | 30 | 90 | 90 | 200 | 200 | 260 | 260 |

The initial water phase and monomer mixtures were charged to a reaction vessel under moderate agitation and a nitrogen purge. The temperature was quickly raised to 71°–73° C. while maintaining good agitation. When the reaction mixture reached 65° C., Component W1 was added. This is time t.0. After seven minutes, 6.48 g of Component W2, a 10% solution of V-50 was added to the reaction vessel. W3 was added at 15 minutes and component W4 was added at 30 minutes. At t=90 minutes, the addition of Water Phase S-I and Monomer Mixture M-I was begun by adding both solutions concurrently at a constant rate over 220 minutes.

Component W5 was also added at t=90 minutes. At t=200 minutes, Component W6 was added. Component W7 was added at t=260 minutes. At t=310 minutes, Water Phase Component S-II was added rapidly over a 3 minute period. Beginning at t=370 minutes, the reaction mixture was allowed to cool while maintaining good agitation.

| | Ex. 3 | C. Ex. 4 |
|---|---|---|
| % solids | 30.38 | 29.58 |
| % coagulum | 0.25 | 0.22 |

Figure 3:
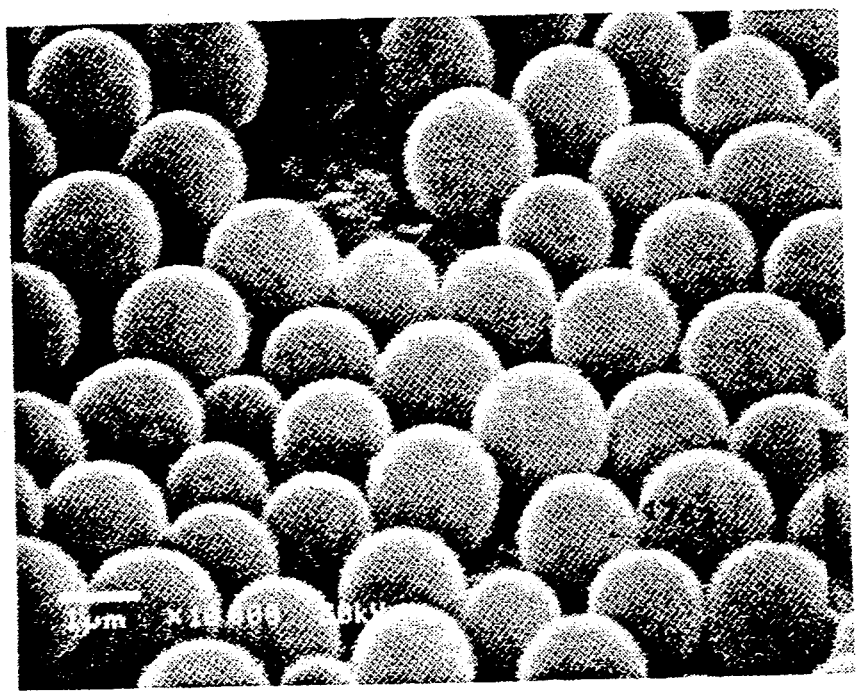
Figure 4:
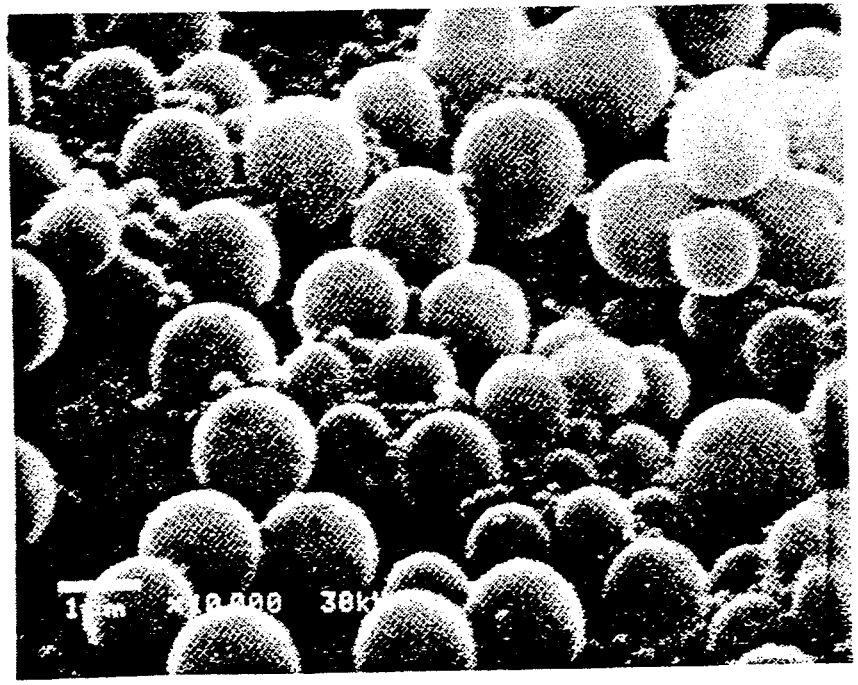

The microspheres of Examples 3 and 4 are shown in FIGS. 3 and 4 respectively.

The particle size distributions described by Tables 5 and 6 and by FIGS. 3 and 4 clearly show that example 3 has a better, more narrow particle size distribution free of excessive undersized particles than example 4 which nucleated small new particles during the course of polymerization as a result of improper balance of the surface charge density.

TABLE 5

| Diameter (microns) | Differential Vol. % over Ex. 3 | Differential Vol. % over C. Ex. 4 | Cumulative Vol. % under Ex. 3 | Cumulative Vol. % under C. Ex. 4 |
|---|---|---|---|---|
| 4.0 | 0 | 1.8 | 100.0 | 98.2 |
| 3.5 | 0 | 0.3 | 100.0 | 97.9 |
| 3.0 | 0 | 0.7 | 100.0 | 97.2 |
| 2.5 | 1.8 | 2.3 | 98.2 | 94.9 |
| 2.0 | 10.1 | 9.7 | 88.1 | 85.2 |
| 1.5 | 42.2 | 28.4 | 46.0 | 56.9 |
| 1.0 | 40.5 | 30.7 | 5.5 | 26.2 |
| 0.9 | 4.5 | 4.8 | 1.0 | 21.4 |
| 0.8 | 1.0 | 4.9 | 0 | 16.4 |
| 0.7 | 0 | 5.5 | 0 | 11.0 |
| 0.6 | 0 | 6.3 | 0 | 4.7 |
| 0.5 | 0 | 2.4 | 0 | 2.2 |
| 0.4 | 0 | 2.1 | 0 | 0.2 |
| 0.3 | 0 | 0.2 | 0 | 0 |

TABLE 6

| Diameter (microns) Ex. 3 | Diameter (microns) C. Ex. 4 | Cumulative Vol. % under |
|---|---|---|
| 2.09 | 2.23 | 90 |
| 1.77 | 1.79 | 80 |
| 1.73 | 1.72 | 75 |
| 1.69 | 1.66 | 70 |
| 1.61 | 1.54 | 60 |
| 1.53 | 1.42 | 50 |
| 1.46 | 1.32 | 40 |
| 1.39 | 1.09 | 30 |
| 1.35 | 0.97 | 25 |
| 1.32 | 0.87 | 20 |
| 1.25 | 0.77 | 15 |
| 1.11 | 0.68 | 10 |
| 0.99 | 0.60 | 5 |

EXAMPLES 5 AND 6

These examples illustrate the use of 2-Propanol with polyvinyl alcohol in the water phase of the emulsion to provide colloidal stabilization without bridging particles together even in the presence of high aqueous initiator levels. Example 5 is the same as example 6 except the latter utilizes 2-Propanol to enhance emulsion stability.

| Monomer Mixture | Initial Charge | M-I | M-II |
|---|---|---|---|
| Sty | 20.05 | 130.58 | 136.25 |
| MMA | — | 20.74 | 13.25 |
| BMA | — | — | 39.74 |
| BA | — | 37.92 | — |
| 2-EHA | 8.97 | — | — |
| MAA | 0.15 | 1.41 | 1.89 |
| nDS | 0.18 | 0.76 | 0.76 |
| DVB | — | 0.19 | 0.19 |
| BPO | — | 0.10 | 0.10 |

| Water Phase Component | Initial Charge | S-I 5 | S-I 6 | S-II 5 | S-II 6 | S-III 5 | S-III 6 |
|---|---|---|---|---|---|---|---|
| 18-S | 0.88 | 3.58 | 3.58 | 3.23 | 3.23 | 1.26 | 1.26 |
| CO-897 | 0.73 | 2.28 | 2.28 | 2.06 | 2.06 | — | — |
| V-205 | 2.92 | 5.67 | 5.67 | 6.63 | 6.63 | 1.53 | 1.53 |

|  | -continued | | | | | | |
|---|---|---|---|---|---|---|---|
| IPA | — | — | 1.15 | — | 1.15 | — | 1.26 |
| NaHCO3 | 0.15 | 0.45 | 0.45 | 0.45 | 0.45 | 0.30 | 0.44 |
| NaOAc | 0.32 | — | — | — | — | — | — |
| V-50 | — | 0.88 | 0.88 | 0.88 | 0.88 | — | — |
| H2O | 308.58 | 101.62 | 100.47 | 101.23 | 100.08 | 8.35 | 6.95 |

| Component | W1 | W2 | W3 | W4 | W5 | W6 | W7 | W8 | W9 | W10 | W11 |
|---|---|---|---|---|---|---|---|---|---|---|---|
| APS | 0.76 | — | 0.25 | — | — | 0.19 | 0.19 | 0.19 | 0.19 | 0.19 | — |
| V-50 | — | 0.44 | — | 0.38 | 0.38 | — | — | — | — | — | — |
| H2O | 6.81 | 3.97 | 2.27 | 3.41 | 3.41 | 1.70 | 1.70 | 1.70 | 1.70 | 1.70 | 1.13 |
| SMBS | — | — | — | — | — | — | — | — | — | — | 0.13 |
| time line (minutes) | 0 | 7 | 15 | 30 | 90 | 160 | 230 | 300 | 370 | 440 | 520 |

The initial water phase and monomer mixtures were charged to a reaction vessel under moderate agitation and a nitrogen purge. The temperature was quickly raised to 71°–73° C. while maintaining good agitation. When the reaction mixture reached 65° C., Component W1 was added.

This is time t=0. After seven minutes, 4.41 g of Component W2, a 10% solution of V-50 was added to the reaction vessel. At t=15 minutes, W3 was added and at t=30 minutes W4 was added. At t=90 minutes W5 was added and the addition of Water Phase S-I and Monomer Mixture M-I was begun by adding both solutions concurrently at a constant rate over 210 minutes.

At t=160 minutes, W6 was added followed by W7 at t=230 minutes. At t=300 minutes, Component W8 was added, Water Phase S-I and Monomer Mixture S-I addition was completed and the addition of Water Phase S-II and Monomer Mixture M-II was started. These solutions were concurrently fed into the reaction vessel at a constant rate over 230 minutes.

Component W9 was added at t=370 minutes followed by W10 at t=440 minutes. After t=530 minutes, the addition of Monomer Mixture M-II and Water Phase S-II were completed and Water Phase S-III was rapidly added over 2 to 3 minutes.

At t=590 minutes, the reaction mixture was allowed to cool while maintaining good agitation. When the temperature of the reaction mixture fell below 70° C., 1.12 g of a solution of 10% sodium metabisulfite was added to complete the reaction.

As can be seen below, the presence of a water phase chain transfer agent, 2-propanol, not only enhanced the emulsion stability, but also may have improved conversion of the reaction

|  | Example 5 | Example 6 |
|---|---|---|
| 2-Propanol | no | yes |
| % solid | 38.25 | 39.02 |
| % coagulum (based on monomer) | >10.0 | 0.91 |

Figure 5:
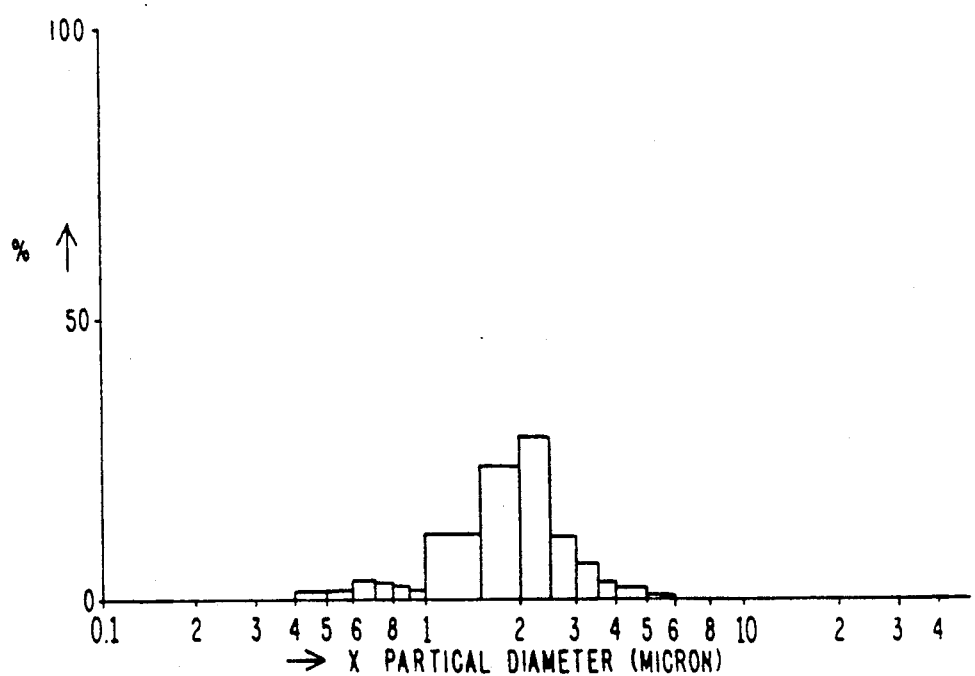
FIGS. 5 and 6 are particle size distributions for the latexes of Examples 5 and 6 respectively.
Figure 6:
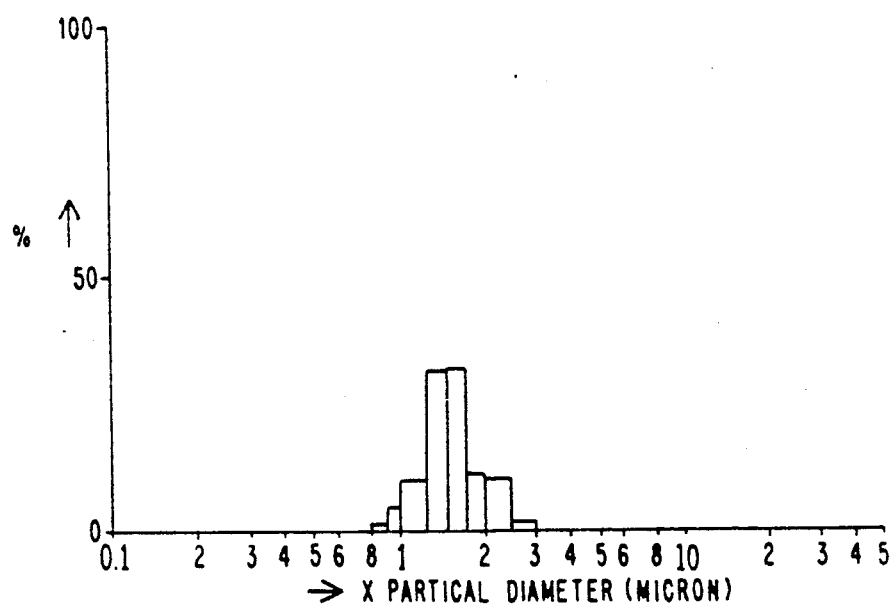

Particle size distribution measurements show that the presence of water soluble chain transfer agent additionally aids in particle size control, yielding a narrower distribution. (FIGS. 5 and 6).

Having described the invention in detail and by reference to preferred embodiments thereof, it will be apparent that modifications and variations are possible without departing from the scope of the invention defined in the appended claims.

What is claimed is:

1. A process for emulsion polymerization to form a latex having a particle size greater than about 0.5 microns comprising the steps of:
   charging to a reaction vessel under agitation a reaction mixture including:
   water, emulsifiers at an initial concentration slightly greater than or equal to the critical micelle concentration, a water soluble polymer which functions as a protective colloid, ethylenically unsaturated monomers, and an ionically balanced combination of an anionic and a cationic water soluble free radical initiator or a non-ionic initiator;
   bringing said reaction mixture to a condition at which said monomer polymerizes and an emulsion of said polymerized monomer is formed; and
   adding additional monomer, emulsifier, and protective colloid and a water soluble chain transfer agent to said reactor while continuing to agitate said reaction mixture under conditions which are controlled such that the concentration of said emulsifier does not exceed a concentration at which substantial new polymeric nuclei are formed, sufficient protective colloid and water soluble chain transfer agent being present to stabilize said emulsion.

2. The process of claim 1 wherein said latex has a particle size of about 1.0 to 2.5 microns.

3. The process of claim 2 wherein said latex contains greater than 30% solids.

4. The process of claim 3 wherein said monomer includes an acrylate, a methacrylate or styrene.

5. The process of claim 1 wherein the amount of said additional surfactants does not create additional micelles.

6. The process of claim 1 wherein in addition to said water soluble chain transfer agent, an oil soluble chain transfer agent is present.

7. The process of claim 1 wherein said water soluble polymer is polyvinyl alcohol.

8. The process of claim 7 wherein said water soluble chain transfer agent is selected from the group consisting of 2-propanol, glucose, sucrose, methanol, 1,4-butanendiol and propylene glycol.

9. The process of claim 6 wherein said oil soluble chain transfer agent is t-dodecylmercaptan or n-dodecylmercaptan.

10. The process of claim 1 wherein said initiator is an ionically balanced combination of an anionic and a cationic initiator.

* * * * *